(12) United States Patent
Harmer

(10) Patent No.: US 9,239,400 B2
(45) Date of Patent: Jan. 19, 2016

(54) METHOD FOR SEPARATING TARGET SIGNALS FROM UNWANTED SIGNALS IN A METAL DETECTOR

(71) Applicant: Minelab Electronics Pty Limited, Torrensville, South Australia (AU)

(72) Inventor: Gregory Peter Harmer, Torrensville (AU)

(73) Assignee: Minelab Electronics Pty Limited, Torrensville, South Australia (AU)

( * ) Notice: Subject to any disclaimer, the term of this patent is extended or adjusted under 35 U.S.C. 154(b) by 0 days.

(21) Appl. No.: 13/763,513

(22) Filed: Feb. 8, 2013

(65) Prior Publication Data

US 2013/0147487 A1    Jun. 13, 2013

Related U.S. Application Data

(63) Continuation of application No. PCT/AU2012/001356, filed on Nov. 5, 2012.

(30) Foreign Application Priority Data

Nov. 3, 2011  (AU) ................................. 2011904563

(51) Int. Cl.
*G01V 3/08*   (2006.01)
*G01V 3/10*   (2006.01)
*G01V 3/30*   (2006.01)

(52) U.S. Cl.
CPC ................ *G01V 3/081* (2013.01); *G01V 3/087* (2013.01); *G01V 3/10* (2013.01); *G01V 3/104* (2013.01); *G01V 3/107* (2013.01); *G01V 3/30* (2013.01)

(58) Field of Classification Search
CPC ......... G01V 3/104; G01V 3/107; G01V 3/10; G01V 3/081; G01V 3/087; G01V 3/30
USPC ................... 324/228, 233, 260, 326, 329, 337
See application file for complete search history.

(56) References Cited

U.S. PATENT DOCUMENTS 5,691,640 A * 11/1997 King ...................... G01V 3/104
                                                                    324/225
5,715,320 A *  2/1998 Allie et al. .................. 381/71.12

(Continued)

FOREIGN PATENT DOCUMENTS

GB         2071327 A     11/1981

OTHER PUBLICATIONS

International Search Report dated Dec. 4, 2012, from corresponding International Application No. PCT/AU2012/001356.

*Primary Examiner* — Tung X Nguyen
*Assistant Examiner* — Adam Clarke
(74) *Attorney, Agent, or Firm* — The Webb Law Firm

(57) ABSTRACT

A method for detecting electrically conductive targets in soil including the steps of: generating a transmit magnetic field for transmission into the soil based on a transmit signal; receiving a receive magnetic field; providing a receive signal induced by the receive magnetic field; selecting at least two models, each approximating a form of a signal due to a different type of source; processing the receive signal using the at least two models to produce at least two independent signals, each representing a component of the receive signal due to a different type of source; and producing, based on at least two independent signals, an indicator output signal indicative of the presence of the electrically conductive target.

14 Claims, 10 Drawing Sheets

(56) References Cited

U.S. PATENT DOCUMENTS

| | | |
|---|---|---|
| 6,541,966 B1 * | 4/2003 | Keene .................... 324/243 |
| 6,583,625 B1 | 6/2003 | Castle |
| 6,911,823 B2 | 6/2005 | Rowan |
| 7,088,103 B2 * | 8/2006 | Kelley .................... 324/326 |
| 7,126,323 B1 * | 10/2006 | Larsen ................... 324/76.77 |
| 7,701,204 B2 | 4/2010 | Westersten |
| 8,729,902 B1 * | 5/2014 | Kelley et al. ............. 324/329 |
| 2005/0062476 A1 | 3/2005 | Stamatescu et al. |
| 2006/0284758 A1 * | 12/2006 | Stilwell et al. ............. 342/22 |
| 2007/0296415 A1 * | 12/2007 | Stamatescu ............... 324/345 |
| 2008/0054893 A1 * | 3/2008 | Humphreys et al. ........ 324/239 |
| 2009/0318098 A1 * | 12/2009 | Stamatescu et al. ........ 455/118 |
| 2010/0283467 A1 * | 11/2010 | Candy .................... 324/326 |
| 2011/0068795 A1 * | 3/2011 | Duvoisin, III ............ 324/326 |

\* cited by examiner

METHOD FOR SEPARATING TARGET SIGNALS FROM UNWANTED SIGNALS IN A METAL DETECTOR

CROSS REFERENCE TO RELATED APPLICATIONS

This application is a Continuation of International Application No. PCT/AU2012/001356 filed on Nov. 5, 2012, which claims benefit of Australian Provisional Patent Application No. 2011904563 titled "Improved Metal Detection Method" filed on Nov. 3, 2011. The entire contents of each application noted above are hereby incorporated by reference.

TECHNICAL FIELD

This invention relates to a method and apparatus for detecting metallic or electrically conductive objects through measuring and processing a receive signal.

BACKGROUND ART

A common form of metal detector is that in which the metal detector transmits a transmit magnetic field and receives a receive magnetic field radiated by elements of the environment that are influenced by that transmit magnetic field. Examples of this type of metal detector include detectors that are used for detecting explosive landmines, unexploded ordnance, precious native metals, coins, jewellery and caches of similar items, in ground. Development of metal detectors has involved not only the improvement of sensitivity to sought objects but, through processing signals due to the receive magnetic field radiated by them, the separation of their radiated signals from those radiated by objects in which the detectorist has less interest, as well as the classification of the nature of the sought target.

Transmission, reception of the receive magnetic field and processing of the signals due to the receive magnetic field are effected through electronic circuitry.

These electronic metal detectors usually include transmit electronics for generating a repeating transmit signal cycle of a fundamental period applied to an inductor, a transmit coil, that transmits a changing magnetic field often referred to as a transmit magnetic field.

Metal detectors can be divided into two main types, depending upon the nature of their transmit field; CW (Continuous Wave) and PI (Pulse Induction) detectors. Some CW detectors transmit magnetic fields that have substantially only one sinusoidal frequency. Others can transmit a transmit magnetic field that is a combination of some small, finite, number of frequencies or, through application of a rectangular transmit signal to a broadband transmit circuit, a large number of frequencies.

PI detectors usually include switching electronics in the transmit electronics, producing a large number of frequencies in the transmit field.

Another way of classifying metal detectors is to class them as either time-domain or frequency-domain detectors. This classification of detectors has more to do with how the receive signals are processed, rather than the nature of the transmit field. Frequency-domain metal detectors could use either PI or CW transmit systems, but usually use CW. Time-domain detectors are commonly seen with either CW or PI transmit systems, but the nature of the transmit magnetic field must be such that it contains a large number of frequencies.

In the types of metal detector described herein, the processing of receive signals is done through synchronous demodulation of an amplified signal induced in a receive coil. In frequency-domain detectors, each channel of demodulation is designed to be most responsive to a single frequency and phase of the receive signal. In time-domain detectors, each channel of synchronous demodulation is designed, by necessity, to be sensitive to a range of frequencies. In some time-domain detectors, there are several channels of synchronous demodulation, each channel emitting a signal representative of a different broad group of frequencies.

Metal detectors contain receive electronics which processes a receive signal from a measured induced voltage due to a receive magnetic field to produce an indicator signal, the indicator output at least indicating the presence of at least some metallic targets within the influence of the transmit magnetic field.

There is a problem with this, whenever the receive signal includes a signal due to the presence of one or more desired metallic objects, it is often mixed with, or contaminated by, unwanted signals, for example signals due to unwanted buried objects (such as ferrous objects), background noises, and signals due to soil or ground. Indeed, it is possible that a receive signal that is composed entirely of unwanted signals will be able to elicit the indication of a target, even when there is no desired target present.

In metal detectors that classify detected targets as well as merely detecting them, contaminated receive signals, if not further processed, can result in erroneous classification of the targets. This can further lead to reduced sensitivity to small or deeply-buried sought objects. Acceptable detection performance can be difficult to achieve without further processing of the receive signal.

A known technique for improving the processing of the receive signals and the reliability of detection is to estimate the unwanted signals prior to applying further processes to a receive signal, then using a function of that estimation to cancel the unwanted signals from the receive signal. This adjusted receive signal is then processed. However, estimation of the unwanted signals generally does not produce a reliable cancellation of the unwanted signals from the receive signal, resulting in reduced reliability of detection of a wanted target.

BRIEF SUMMARY OF THE INVENTION

According to a first aspect of the present invention, there is provided a method for detecting electrically conductive targets in soil including the steps of generating a transmit magnetic field for transmission into the soil, based on a transmit signal; receiving a receive magnetic field; providing a receive signal induced by the receive magnetic field; selecting at least two models, each approximating a form of a signal due to a different type of source; processing the receive signal using the at least two models to produce at least two independent signals, each representing a component of the receive signal due to a different type of source; and producing, based on at least two independent signals, an indicator output signal indicative of the presence of the electrically conductive target.

In one embodiment, the selecting at least two models includes selecting a model modelling a signal due to a ferrous object. In one embodiment, the selecting at least two models includes selecting a model modelling a signal due to a non-ferrous electrically conductive object. In one embodiment, the selecting at least two models includes selecting a model modelling a signal due to the soil. In one embodiment, the at least two independent signals are further processed to further quantify one or more parameters of the electrically conductive target.

According to a second aspect of the present invention, there is provided a metal detector for detecting an electrically conductive target in soil, including a transmitter for transmitting a magnetic field into the soil based on a transmit signal; a receiver for receiving a receive magnetic field to provide a receive signal induced by the receive magnetic field; a processor for selecting at least two models, each approximating a form of a signal due to a different type of source, processing the receive signal using the at least two models to produce at least two independent signals, each representing a component of the receive signal due to a different type of source, and producing, based on at least two independent signals, an indicator output signal indicative of the presence of the electrically conductive target.

In one embodiment, the at least two models include a model modelling a signal due to a ferrous object. In one embodiment, the at least two models include a model modelling a signal due to a non-ferrous electrically conductive object. In one embodiment, the at least two models include a model modelling a signal due to the soil.

According to a third aspect of the present invention, there is provided a time-domain metal detector including a transmitter for transmitting a magnetic field into the soil based on a transmit signal; a receiver for receiving a receive magnetic field to provide a receive signal induced by the receive magnetic field; a synchronous demodulator for synchronous demodulating the receive signal using at least two different synchronous demodulation functions to produce at least two demodulated signals; and a processor for selecting at least two models, each approximating a form of a signal due to a different type of source, processing the at least two demodulated signals using the at least two models to produce at least two independent signals, each representing a component of the receive signal due to a different type of source; and producing, based on at least two independent signals, an indicator output signal indicative of the presence of the electrically conductive target.

According to a fourth aspect of the present invention, there is provided frequency-domain metal detector including a transmitter for transmitting a magnetic field into the soil based on a transmit signal; a receiver for receiving a receive magnetic field to provide a receive signal induced by the receive magnetic field; a synchronous demodulator for synchronous demodulating the receive signal using at least two different sinusoidal frequencies to produce at least two demodulated signals; and a processor for selecting at least two models, each approximating a form of a signal due to a different type of source, processing the at least two demodulated signals using the at least two models to produce at least two independent signals, each representing a component of the receive signal due to a different type of source; and producing, based on at least two independent signals, an indicator output signal indicative of the presence of the electrically conductive target.

DETAILED DESCRIPTION OF THE INVENTION

Figure 1:
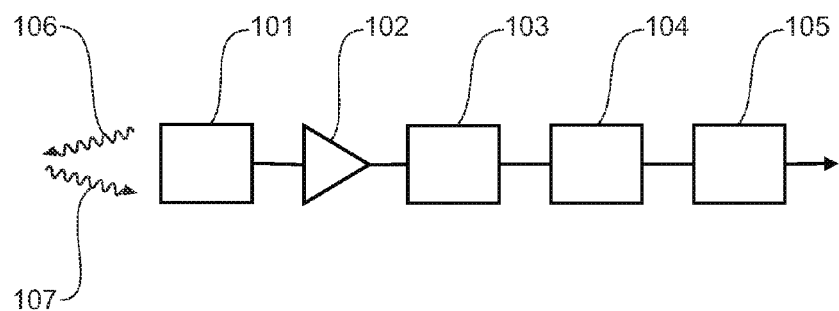
FIG. 1 is an operational block diagram depicting the main functionalities of a metal detector.

The operational block diagram of a metal detector is depicted in FIG. 1. The transmit-receive assembly sensor head 101 contains a transmit coil and a receive coil and electronics to supply a repeating transmit signal cycle to the transmit coil. In some PI detectors, the transmit coil and the receive coil are the same single coil.

A transmit magnetic field 106 is emitted from the transmit coil of the sensor head 101. The receive magnetic field 107 is some of the transmit magnetic field 106 radiated from nearby elements of the environment, for instance, ground, non-ferrous conductive targets and unwanted objects, for example some types of ferrous objects. The receive magnetic field 107 may also include magnetic fields generated by objects due to the influence of the transmit magnetic field 106.

The receive signal is fed from the sensor head 101 to an amplifier 102 that, in turn, feeds the amplified receive signal to a synchronous demodulator 103. The synchronous demodulator samples the amplified receive signal at times that are synchronous with the transmit signal cycle applied to the transmit coil. The synchronous demodulator 103 may include more than one synchronous demodulator module, each using a different synchronous demodulating function. Alternatively, the synchronous demodulator 103 may be a digital synchronous demodulator when the receive signal is converted to digital form with an ADC.

The synchronous demodulator 103 produces a plurality of channels, each of which is a function of some component of the original receive signal. These channels are fed to the signal processing system 104, that includes a system for using the channels to produce signals that are representative of separate components of the receive signal due to different types of sources in the detecting environment (e.g. ferrous, non-ferrous objects are different types of sources).

Further processing, in order to determine whether a signal is indicative of a sought target, is performed in processor or processing unit 105 and its result is presented as an indicator output signal that will alert the user of the detection when a desirable target is detected.

Figure 2:
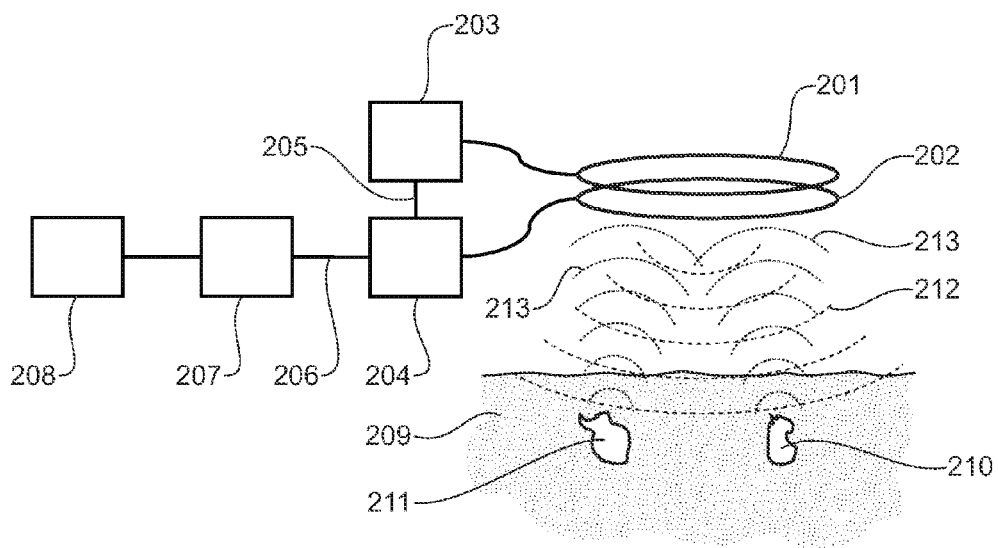
FIG. 2 depicts a transmission of a transmit magnetic field from a transmit coil of a metal detector, and a reception of a magnetic field radiated by physical elements of the environment with its receive coil.

Some parts of the process are illustrated in more detail in FIG. 2. The transmit coil 201 is connected the transmit electronics 203. The transmit electronics 203 provides the transmit coil 201 with a varying voltage signal, thereby producing a time-varying current in the transmit coil 201 that produces the transmit magnetic field 212.

Changing magnetic fields, or receive magnetic fields 213, are produced by the ground 209 and unwanted objects 210 and non-ferrous, electrically conductive objects 211, under the influence of the transmit magnetic field. These receive magnetic fields induce electrical signals in the receive coil 202. The receive coil and electronics are arranged in such a way that there is no net signal generated in the receive electronics from the transmit coil being coupled to the receive coil. This could be through magnetically or electronically nulling the receive coil 202 with respect to the transmit coil 201, or by having the receive coil 202 as being the same coil as the transmit coil 201, which is possible in some types of PI detector.

The receive coil 202 is connected to the receive electronics 204, where the receive signal is amplified and synchronously demodulated. The connection 205 conducts the synchronising signal. The demodulations are synchronous with the timing of the transmit electronics 203. It is through the demodulation that the receive signal is transformed into signal channels with different properties.

The resulting channels 206 are fed to the signal processor 207 where they are used as data for the transformation of the receive signal into component parts of signals from the different sources 209, 210, 211. Finally, the results of the signal processing are fed to an indicator 208 that shows the detectorist the results in some manner that can be understood.

Figure 3A:
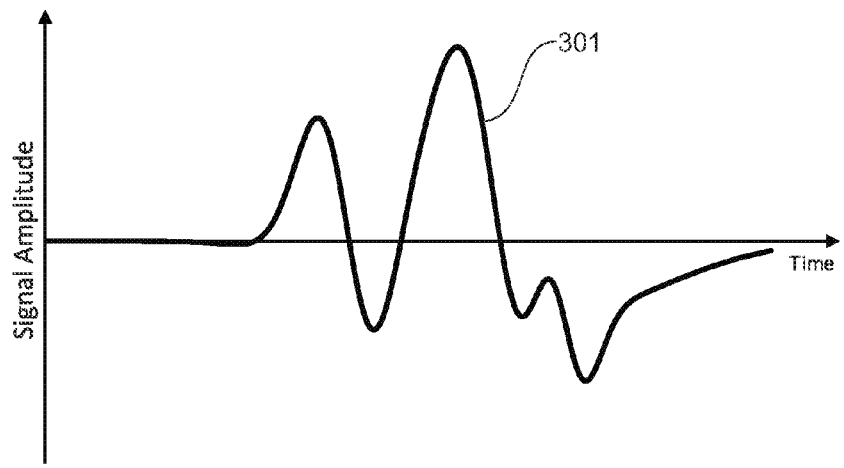
FIG. 3A depicts an example of a receive signal as manifest in a receive coil. It is the superposition of the signals from independent sources shown in FIG. 3B.
Figure 3B:
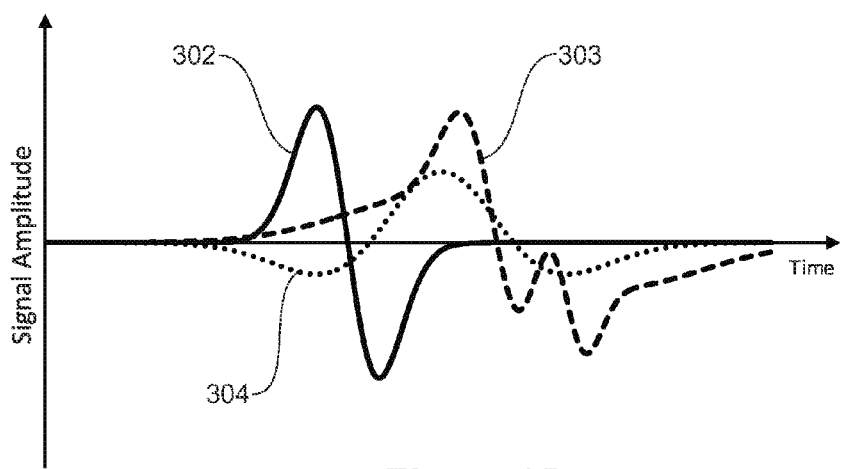
FIG. 3B shows receive signals from independent sources. The superposition of these signals produces the signal shown in FIG. 3A.

An example of a receive signal 301 induced in the receive coil 202 is depicted in FIG. 3A, with time as the independent variable in the graph. The signals from a non-ferrous conducting target 302, magnetic soil 304 and an unwanted object 303, in this case ferrous, are depicted in FIG. 3B. The superposition of these signals produces the receive signal 301.

The present invention uses at least two predetermined models to resolve the receive signal into at least two of the signal due to the soil, the signal due to the target, and the signal due to unwanted objects. In some embodiments, the unwanted objects are ferrous objects.

For example, if the receive signal is to be resolved into the signal due to the soil and the signal due to the target, a model for the soil and a model for the target are selected. Alternatively, if the receive signal is to be resolved into the signal due to the unwanted objects and the signal due to the target, a model for the unwanted objects and a model for the target are selected. It is also possible to resolve the receive signal into three signals, the signal due to the soil, the signal due to the target, and the signal due to unwanted objects, by selecting three appropriate models. In general, it is possible to resolve the receive signal into any number of sources given that there is enough information in the receive signal.

With reference to one embodiment, a time-domain metal detector transmits a transmit field from its transmit coil 201 and has a receive signal 301 induced in its receive coil 202 that is a combination of the signals 302, 303, 304 induced in the receive coil 202 by radiated fields 213 from various elements of the environment 209, 210, 211. The receive signal is sampled, or demodulated, at several different intervals. For example, it could sampled at four different intervals, a first interval with more high-frequency components, a second interval with more medium frequency components, a third interval with more low-frequency components, and a fourth interval with more very low frequency components. For ease of explanation, the receive signal can be represented by the vector $x=[H\ M\ L\ V]^T$, where H represent a signal representative of the receive signal during the first interval, M represent a signal representative of the receive signal during the second interval, L represent a signal representative of the receive signal during the third interval, and V represent a signal representative of the receive signal during the fourth interval.

Figure 4:
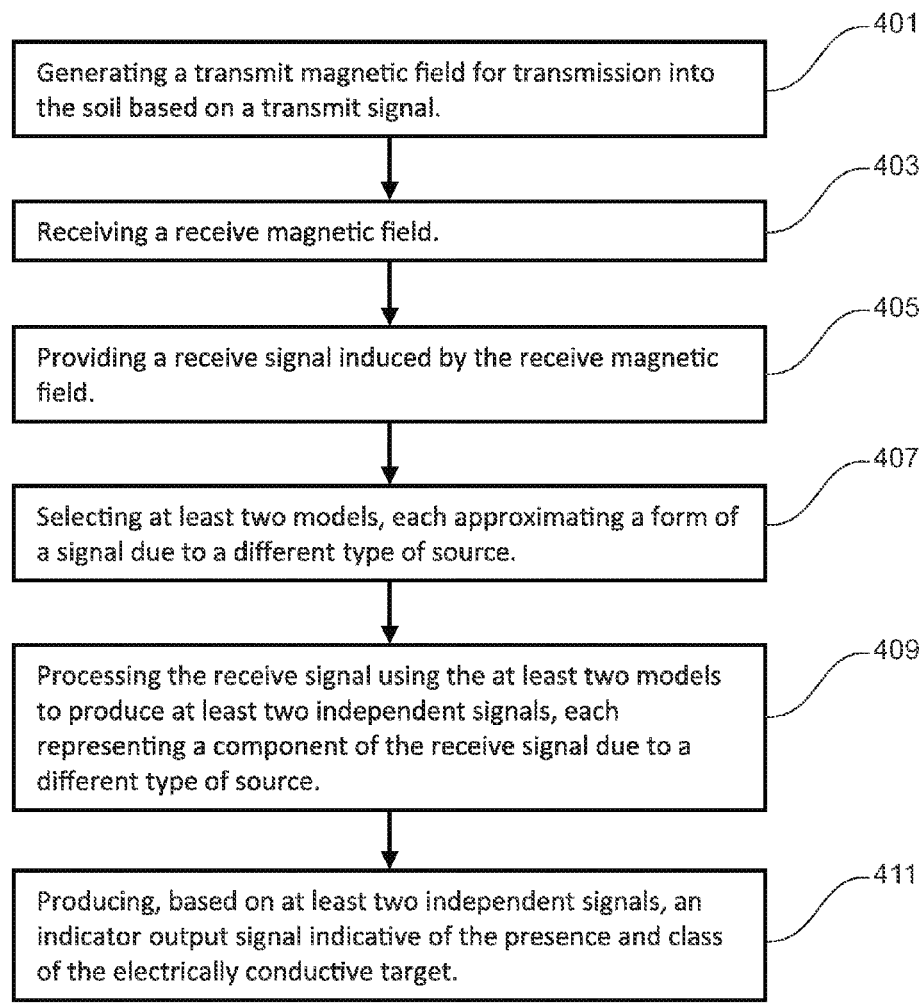
FIG. 4 is flowchart depicting a broad form of the present invention.

A broad form of the present invention is shown in FIG. 4. The steps shown are not required to be performed in the sequence shown in FIG. 4. For example, steps 407 can occur prior to step 405. The first step 401 is common to many metal detectors, and the transmission of a transmit magnetic field into an interrogated region that is being searched for targets is required for detectors incorporating this invention. This interrogated region is often filled with soil, sometimes appreciably magnetic soil.

Magnetic fields radiated by objects and soil in the interrogated region link with a receiver of these receive fields 403. The receive fields induce a receive signal in the receiver, the receiver often being a coil 405.

At least two models are used in the separation of the receive signal into source signals are selected 407.

The step 409 separates the signals due to a different type of source (independent source signals) from the receive signal may include the synchronous demodulation of the receive signal.

With the separated, independent source signals, an indicator output signal is generated and presented to the user if a desired target is deemed to be present within the interrogated region 411.

The models can be determined in various ways. In this context, a model is some relation that describes the amplitude of a received channel with respect to one or more parameters that influence this received amplitude. The model can take several forms, in one case it could be set of equations that define the response for each channel, or in another case it could be a dictionary lookup from a number of predefined fixed parameter models.

A target (typically non-ferrous metallic coins and ring objects) depends on the characteristic time constant r, or equivalently on the characteristic frequency $f_C$, which is related to the time constant by $f_C=1/(2\pi\tau)$.

For a first order model there is only a single characteristic frequency, for higher order models there are multiple characteristic frequencies.

There is a number of methods that can be employed to obtain a model for a non-ferrous object or target. The choice of method will depend upon the application, how well the target can be defined, or the ease of implementation of a particular method.

Figure 5A:
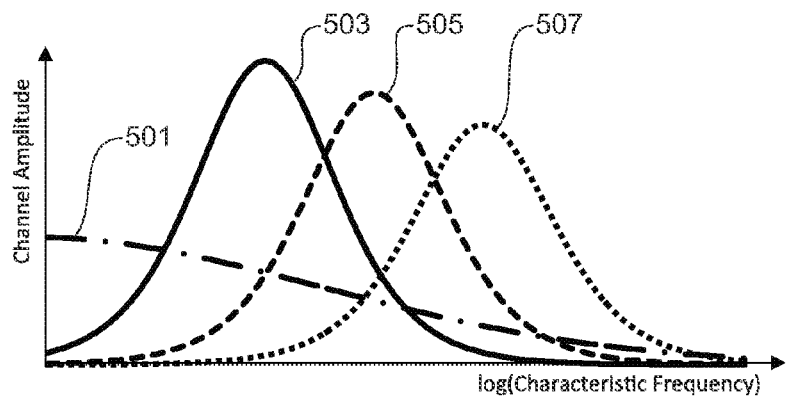
FIG. 5A shows an example of a model for non-ferrous targets for a time-domain detector with four channels.

One method is to derive the theoretical response to an idealised target. For a first order approximation, the idealised target would take the form of a simple RL circuit. FIG. 5A shows the first order target model for four channels in a time-domain detector. The curves 501, 503, 505, 507 represent the response for the V, L, M and H channels respectively.

Given information about the transmit and receive electronics and the demodulation intervals, one can determine theoretically, or from simulations using a computer program, the response curves in FIG. 5A. Alternatively, an empirical approach is to measure the amplitude from each channel using a RL surrogate target with adjustable resistance or inductance. The curves 501, 503, 505, 507 in FIG. 5A are generated by sweeping the surrogate target though a range of characteristic frequencies. Alternatively, if the characteristic frequency is known for a number of real targets, these can be used to generate the curves 501, 503, 505, 507 in FIG. 5A.

Figure 5B:
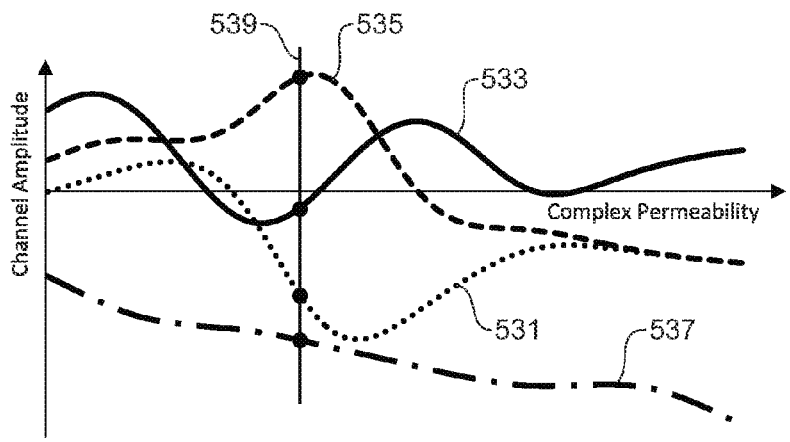
FIG. 5B shows an example of a model for soil for a time-domain detector with four channels.

For a time-domain detector, the model for soil depends upon the magnetic permeability which can be complex, of the soil. FIG. 5B shows a representation of the soil model in a time-domain detector. The curves 531, 533, 535, 537 represent the response for the V, L, M and H channels respectively. The horizontal axis in FIG. 5B represents the complex permeability hence the curves 531, 533, 535, 537 are only one particular view of the soil model. Given information about the transmit and receive electronics and the demodulation intervals, one can determine theoretically, or from simulations using a computer program, the response curves in FIG. 5B. For a time-domain detector, the complete soil model is difficult to determine. It is typical practice to take a measurement of the soil in the detection region of interest, in a section where there are no targets. The line 539 shows the position where the soil measurement was taken, and the intersection with curves 531, 533, 535, 537 yields the soil model. This fixed model can be used in the detection region of interest where the soil properties are practically constant.

Figure 5C:
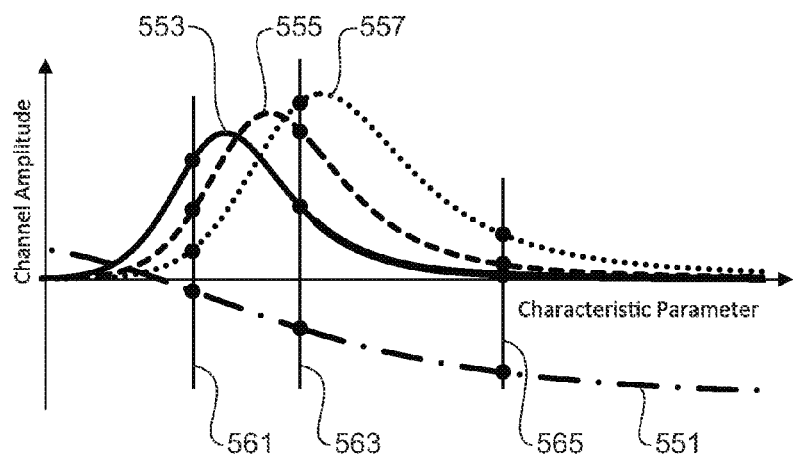
FIG. 5C shows an example of a model for unwanted objects for a time-domain detector with four channels.

A model for an unwanted object (also referred to as a model for ferrous object) that is considered to be an object of ferrous nature, depends on magnetic permeability, electrical conductivity, size and shape of the object. FIG. 5C shows representation of the unwanted object model in a time domain detector. The curves 551, 553, 555, 557 represent the response for the V, L, M and H channels respectively. The horizontal axis in FIG. 5C represents a variable that depends on permeability, conductivity, size and shape, which can be referred to as the characteristic parameter. FIG. 5C essentially has multiple dimensions all represented by the horizontal axis, hence the curves 551, 553, 555, 557 are only one particular view of the unwanted object model. Given information about the transmitter and receiver electronics and the demodulation intervals, one can determine theoretically, or from simulations using a computer program, the response curves in FIG. 5C. However, due to the number of parameters required to specify the unwanted object model, it may be impractical to solve for all the parameters. Rather than specifying a full model, several measurements of common unwanted objects can be taken and used as the model. The lines 561, 563, 565 show the positions where the common unwanted targets lie on the full model. The intersections of the lines 561, 563, 565 with the curves 551, 553, 555, 557 give the fixed model for each of the common unwanted targets. For example, line 561 could be for nails, the line 563 could be for rusty containers, and line 565 could be for a piece of wire.

Depending upon the type of a metal detector, the models can be used in various ways to resolve the resultant receive signal (for example, 301 of FIG. 3A) into the signals from different type of sources (for example, 302, 303, and 304 of FIG. 3B).

In the case where the receive signal is to be resolved into a signal due to the target and a signal due to the soil, an equation linking the receive signal, the signal due to the target and the signal due to the ground can be formed:

$$\begin{bmatrix} H \\ M \\ L \\ V \end{bmatrix} = k_T \begin{bmatrix} H_T(f_C) \\ M_T(f_C) \\ L_T(f_C) \\ V_T(f_C) \end{bmatrix} + k_G \begin{bmatrix} H_G \\ M_G \\ L_G \\ V_G \end{bmatrix} \quad (1)$$

where $k_T$ is the unknown magnitude of the strength of the signal due to the target, $H_T$, $M_T$, $L_T$ and $V_T$ are a functional form of the target model for each of the channels H, M, L and V respectively, the vector $[H_T(f_C) M_T(f_C) L_T(f_C) V_T(f_C)]^T$ is a selected target model with unknown characteristic frequency $f_C$ of the target, $k_G$ is the unknown magnitude of the strength of the signal due to the soil, and $[H_G M_G L_G V_G]^T$ is a selected soil model.

In general, the soil model could be in a functional form depending on magnetic permeability μ, for example, where the soil model would take the form $[H_G(\mu) M_G(\mu) L_G(\mu) V_G(\mu)]^T$. An example of such a soil model, for a time-domain detector, is depicted in FIG. 5B. In practice, the soil model can be selected or determined through a measurement prior to the actual detection. In this typical case, the unknown permeability is determined and the soil model becomes a fixed vector, such as $[H_G M_G L_G V_G]^T$ as seen in equation (1).

In forming equation (1), several assumptions have been made. It is assumed that the response from each source is independent of any other source. That is, there are no interactions between any two sources that will affect their fields emitted due to the transmit magnetic field. In the case of targets and unwanted objects, any interactions are usually extremely small so this assumption holds. In the case of soil, the magnetic permeability of soil is weak, so this assumption still holds. It is also assumed, which follows from the weak interactions between sources, that the receive signal from two or more sources is a linear superposition of the receive signal from each of the sources that would be detected were they detected individually. If there is no interaction between the sources, then the principle of superposition must apply. It is also assumed that noise will be present in the measurement of the received signal; this noise is not represented explicitly in equation (1).

Equation (1) can be rewritten in vector notion, for clarity, as $$x = k_T \cdot t_T(f_C) + k_G \cdot t_G \quad (2)$$

where $t_T(f_C) = [H_T(f_C) M_T(f_C) L_T(f_C) V_T(f_C)]^T$ is the target model and $t_G = [H_G M_G L_G V_G]^T$ is the soil model.

Equation (2) is actually four equations with three unknown parameters, $k_T$, $f_C$, and $k_G$, and thus can be solved. Examples of methods of solution include least squares if the target model is linear. Otherwise, non-linear regression methods such as the GN (Gauss-Newton) algorithm or the Levenberg-Marquardt algorithm can be used; both are first-order gradient-descent optimization algorithms.

For example, assuming a non-linear target model $t_T(f_C)$ and using the Gauss-Newton algorithm, the unknown parameters can be found by the iterative solution $$\theta_{n+1} = \theta_n + (H(\theta_n)^T H(\theta_n))^{-1} H(\theta_n)^T (x - s(\theta_n)) \quad (3)$$

where $\theta = [f_C k_T k_G]^T$ is a vector of the unknown parameters, $s(\theta) = k_T \cdot t_T(f_C) + k_G \cdot t_G$ is the model receive signal, the matrix H is the Jacobian of $s(\theta)$ and the subscript n denotes the iteration number. If the model for the target model $t_T(f_C)$ is linear so that $s(\theta) = H\theta$, then (3) reduces to the standard single-step, linear least squares solution $$\theta = (H^T H)^{-1} H^T x. \quad (4)$$

Once the unknown parameters are determined, the signal due to the target and the signal due to the soil can be separated. For example, the signal due to the target can be constructed by $$s_T = x - k_G \cdot t_G \quad (5)$$

or $$s_T = k_T \cdot t_T(f_C) \quad (6)$$

where the form of equation (5) contains the fitting error, that is, the noise from the receive signal. In some applications this may be more desirable than the form of equation (6) which will have the reconstructed source signal strictly conforming to the target model. Typically, the signal due to the soil is not important and is discarded.

In the case where the receive signal is to be resolved into a signal due to a target and a signal due to an unwanted object, an equation linking the receive signal, the signal due to the target, and the signal due to the unwanted objects can be formed:

$$\begin{bmatrix} H \\ M \\ L \\ V \end{bmatrix} = k_T \begin{bmatrix} H_T(f_C) \\ M_T(f_C) \\ L_T(f_C) \\ V_T(f_C) \end{bmatrix} + k_F \begin{bmatrix} H_F \\ M_F \\ L_F \\ V_F \end{bmatrix} \quad (7)$$

where $k_T$ is the unknown magnitude of the strength of the signal due to the target, $H_T$, $M_T$, $L_T$ and $V_T$ are functional forms of the target model for each of the channels H, M, L and V respectively, the vector $[H_T(f_C) M_T(f_C) L_T(f_C) V_T(f_C)]^T$ is a selected target model with unknown characteristic frequency $f_C$ of the target, $k_F$ is the unknown magnitude of the strength of the signal due to the unwanted object, and $[H_F M_F L_F V_F]^T$ is a selected model of unwanted objects.

In general, the model of unwanted objects could be in a functional form describing an ideal conductive, permeable sphere, which would depend on magnetic permeability $\mu$, conductivity $\sigma$ and radius r; for example, the unwanted object model would take the form $[H_F(\mu,\sigma,r) M_F(\mu,\sigma,r) L_F(\mu,\sigma,r) V_F(\mu,\sigma,r)]^T$. In practice, a closed form of the unwanted target model may be difficult or impossible to determine. An empirical form may be determined from common unwanted objects. A simpler solution is to use a dictionary lookup of common unwanted objects. In this typical case, the predetermined set of unwanted object models would take the form $[H_{Fi} M_{Fi} L_{Fi} V_{Fi}]^T$, where i denotes the model number in the dictionary lookup of a number ($N_F$) of common unwanted targets. For example, a first instance could be for nails, a second instance could be for rusty containers, and third instance could be for a piece of wire.

Equation (6) can be rewritten in vector notion for clarity as $$x = k_T \cdot t_T(f_C) + k_F \cdot t_{Fi} \quad (8)$$

where $t_T(f_C) = [H_T(f_C) M_T(f_C) L_T(f_C) V_T(f_C)]^T$ is the target model and $t_{Fi} = [H_{Fi} M_{Fi} L_{Fi} V_{Fi}]^T$ is the i-th unwanted target model from the dictionary.

Accordingly, the only unknowns are $k_T$, $f_C$, and $k_F$. Equation (8) is actually four equations with three unknown parameters, and thus can be solved using similar methods as for equation (2). In the case where a dictionary lookup is used for the unwanted target model, equation (8) needs to be solved $N_F$ times using the appropriate model $t_{Fi}$. This will provide $N_F$ separate solutions for the unknown parameters, one for each unwanted target object. The appropriate model $t_{Fi}$ and parameters can then be selected based on the solution with the smallest fitting error for example. Other metric to determine the best unwanted object model can also be utilised.

Once the unknown parameters are determined, the signal due to the target and the signal due to the unwanted object can be isolated as follows:

$$s_T = x - k_F \cdot t_{Fi} \text{ and} \quad (9)$$

$$s_F = x - k_T \cdot t_T(f_C) \quad (10)$$

where the forms in equations (9) and (10) contain the fitting error.

In the case where the receive signal is to be resolved into a signal due to the target, a signal due to the soil and a signal due to unwanted objects, an equation linking the receive signal, the signal due to the target, the signal due to the soil and the signal due to the unwanted objects can be formed:

$$\begin{bmatrix} H \\ M \\ L \\ V \end{bmatrix} = k_T \begin{bmatrix} H_T(f_C) \\ M_T(f_C) \\ L_T(f_C) \\ V_T(f_C) \end{bmatrix} + k_G \begin{bmatrix} H_G \\ M_G \\ L_G \\ V_G \end{bmatrix} + k_F \begin{bmatrix} H_F \\ M_F \\ L_F \\ V_F \end{bmatrix} \quad (11)$$

where the variables have been previously defined.

Equation (11) can be rewritten in vector notion, for clarity, as $$x = k_T \cdot t_T(f_C) k_G \cdot t_G + k_F \cdot t_{Fi} \quad (12)$$

Accordingly, the only unknowns are $k_T$, $f_C$, $k_G$ and $k_F$. Equation (12) is actually four equations with four unknown parameters, and thus can be solved. However, in practical situations, in particular when the number of parameters to solve for approaches the number of equations, there could be reliability issues in solving (12). One remedy is to increase the information content of the receive signal, by increasing the number of channels for example. Another remedy is to add constraints to the system of equations, such as modifying how the receive signal is measured so that all the unknown parameters are greater than zero.

Once the unknown parameters are determined, the signal due to the target, the signal due to the soil and the signal due to the unwanted objects can be separated as follows:

$$s_T = x - (k_G \cdot t_G + k_F \cdot t_{Fi}) \quad (13)$$

$$s_G = x - (k_T \cdot t_T(f_C) k_F \cdot t_{Fi}) \quad (14)$$

$$s_F = x - (k_T \cdot t_T(f_C) + k_G \cdot t_G) \quad (15)$$

Another embodiment can be that of a frequency-domain detector with a number of, say three, transmit frequencies. The frequencies of the frequency domain detector are equivalent to the channels of a time domain detector. Each frequency of the receive signal is further demodulated into its in-phase (P) and quadrature (Q) components, with respect to the phase of the corresponding frequency component of the transmit signal. The P and Q components are commonly referred to as a channel since the P and Q components are actually parts of the same complex signal P+jQ. Therefore, the receive signal for three frequency components can be represented by the vector $x = [P_1+jQ_1, P_2+jQ_2, P_3+jQ_3]^T$, where the subscript denotes the frequency component F1, F2 and F3.

In a similar manner as for the time-domain embodiment, models can be formed for each of the signal sources, that is, targets, unwanted objects and soil. In the frequency domain, the measurable (i.e. the vertical axis) will be the amplitude of the P and Q components for each frequency, which can still be referred to as the channel amplitude. The parameters that influence the behaviour of the channel amplitudes remain the same; the physics of the magnetic interaction between the detector and the objects has not changed.

There are various methods that can be employed to obtain the models, which are similar to those described for the time-domain embodiment.

Figure 6A:
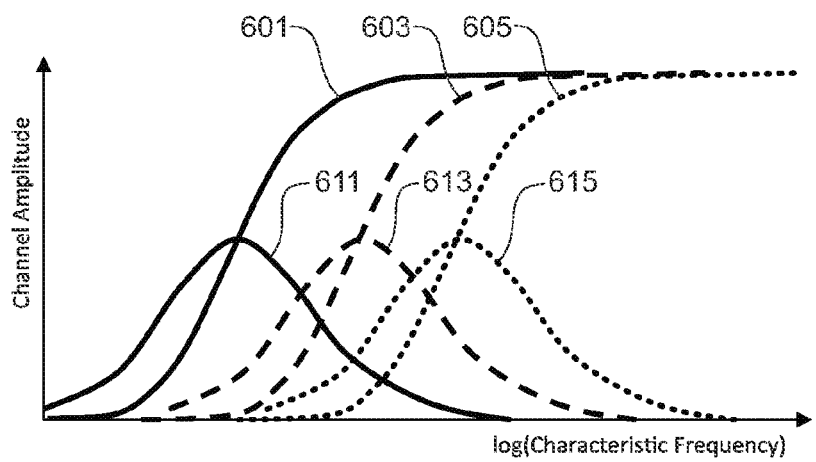
FIG. 6A shows an example of a model for non-ferrous targets for a frequency-domain detector with three frequencies.

FIG. 6A shows a first order model of target which includes three channels for a frequency-domain detector. The curves 601, 603, 605 represent the in-phase response for F1, F2 and F3, and the curves 611, 613, 615 represent the quadrature response for F1, F2 and F3.

Figure 6B:
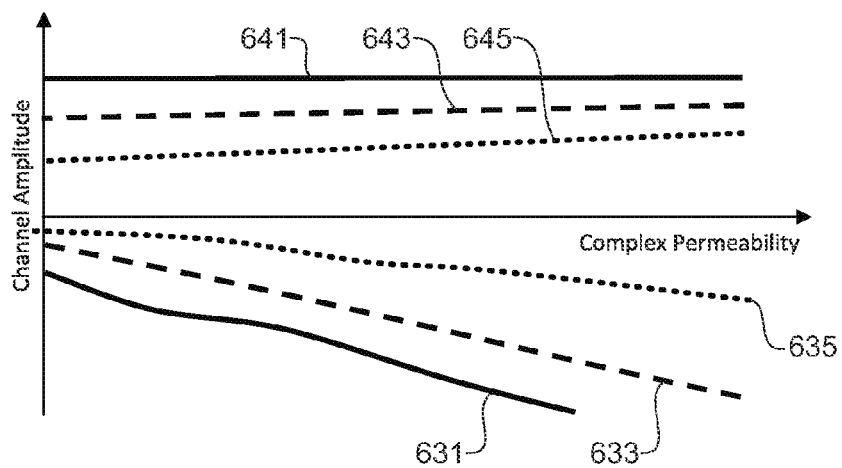
FIG. 6B shows an example of a model for soil for a frequency-domain detector with three frequencies.

FIG. 6B shows a representation of the model of soil for a frequency-domain detector. The curves 631, 633, 635 represent the in-phase response for F1, F2 and F3, and the curves 641, 643, 645 represent the quadrature response for F1, F2 and F3.

Figure 6C:
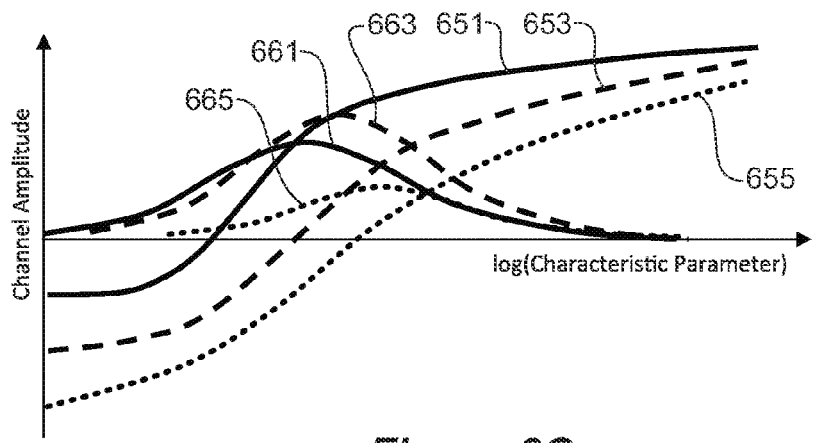
FIG. 6C shows an example of a model for unwanted objects for a frequency-domain detector with three frequencies.

FIG. 6C shows a representation of the model of an unwanted object for a frequency domain detector. The curves 651, 653, 655 represent the in-phase response for F1, F2 and F3, and the curves 661, 663, 665 represent the quadrature response for F1, F2 and F3.

Depending upon the type of a metal detector, the models can be used in various ways to resolve the resultant receive signal into the source signals. In the case where the receive signal is to be resolved into a signal due to the target and a signal due to the soil, equation (2) applies with $t_T(f_C)$ and $t_G$ referring to the frequency-domain models. In the case where the receive signal is to be resolved into a signal due to the target and a signal due to unwanted objects, equation (8) applies with $t_{Fi}$ referring to the frequency-domain model. In the case where the receive signal is to be resolved into a signal due to the target, a signal due to the soil and a signal due to unwanted objects, equation (12) applies with the models referring to the frequency domain.

Similarly, once the unknown parameters are determined, the signal due to the target, the signal due to the soil and the signal due to the unwanted objects can be separated according to equations (13) to (15).

Figure 7:
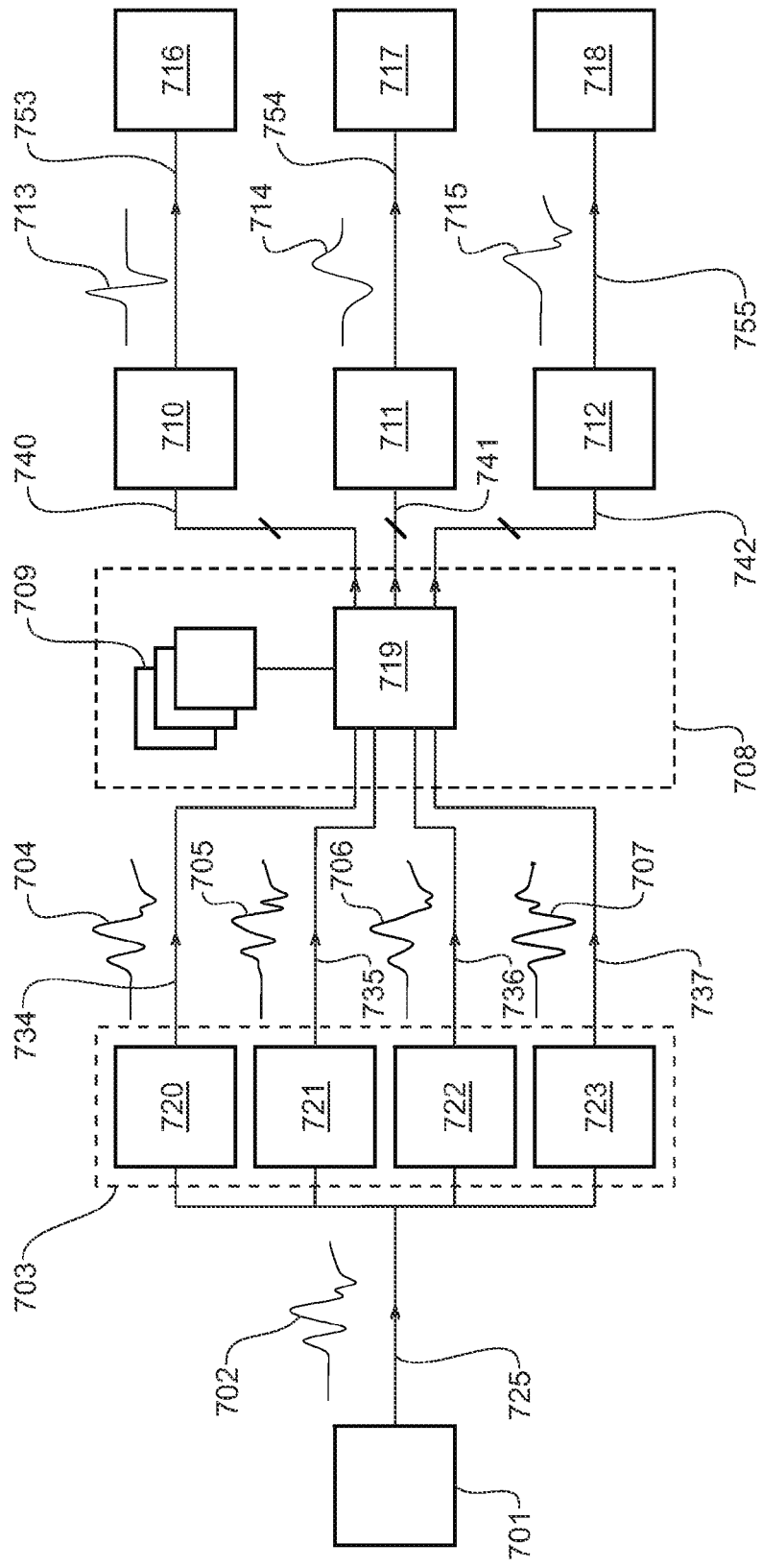
FIG. 7 is a block diagram depicting an exemplary process, within a metal detector, of separation of a receive signal into signals from different sources.

FIG. 7 depicts a way of implementing synchronous demodulation and processing of a receive signal in accordance with the principle of the present invention. A transceiver 701 both transmits a transmit magnetic field and receives a receive magnetic field, and amplifies a receive signal induced by the receive magnetic field. The amplified receive signal 702 is fed to a bank of synchronous demodulators 703 via the connection 725. The demodulations are synchronous with the timing of the transmit signal in the transceiver 701.

As shown in this embodiment in relation to a time-domain detector, there are four synchronous demodulators 720, 721, 722, 723, but their number in other embodiments need not be four; they might be fewer, or more. The restriction on the number of demodulators is that there must be, at fewest, enough channels to allow a solution of the relevant equations with whatever number of models is selected to be used by the separation processor at the time. In this embodiment, each demodulator, 700, 701, 702, 703, samples the amplified receive signal 702 over pre-determined intervals, producing channel signals 704, 705, 706, 707, respectively. The demodulations could be arranged so as to produce outputs 704, being characterised by it having a large proportion of the low-frequency components of the receive signal 702, 705, being characterised by it having a large proportion of the mid-frequency components of the receive signal 702, 706, being characterised by it having a large proportion of the high-frequency components of the receive signal 702, and 707 being characterised by it having a large proportion of the components of the receive signal 702 due to instantaneous magnetisation of sources influenced by the transmit magnetic field, that is, the very low frequency components.

The channel signals 704, 705, 706, 707 are fed to the separation processor 708 via connections 734, 735, 736 and 737, respectively. The selected models 709 and the channel signals 704, 705, 706 and 707 are used by the separation processor to generate, for each selected model, a set of channel signals. The channel signal sets are each a group of channels that correspond the synchronous demodulator channels 704, 705, 706 and 707. For this embodiment, where there are three selected models in 709, each set of channel signals is determined by equations (13) to (15) for example. The separation processor 708 has calculated in 719, using the method described by equation (3) for example, the unknowns in equation (12) to provide the channel signals.

The channel signal sets are fed to DSP units 710, 711, 712 via connections 740, 741, 742, wherein they are further processed. The short oblique lines shown on connection lines 740, 741, 742 indicate that a plurality of signals is communicated, in this embodiment the connections 740, 741, 742 represent a set of four channels that have been sent from 719 to the DSP units 710, 711, 712. For example, as shown in FIG. 7, each of the channel signal sets could be processed to produce estimated source signals 713, 714, 715 respectively. Alternatively, or in addition, the further processing could involve determination of detection, classification of targets or estimation of other parameters of the target or other elements in the environment. In this embodiment, the estimated source signal 713 is an estimate of the signal due to a non-ferrous source, the estimated source signal 714 is an estimate of the signal due to soil, and the estimated source signal 715 is an estimate of the signal due to an unwanted object.

The three processed source signals are fed to output stages 716, 717, 718 via connections 753, 754, 756, to output an indicator output signal that is to be emitted to alert the user of the detector. It is also possible that the output stages 716, 717, 718 can communicate with each other in order to emit the most appropriate output to the user. Alternatively, only one signal is selected as an indicator output signal.

FIG. 7 can be interpreted as depicting an embodiment of the invention within a frequency-domain detector. It can be interpreted as depicting a frequency-domain detector with four demodulated sinusoidal frequencies, each frequency having its associated P and Q channels. In other embodiments, the number of demodulated sinusoidal frequencies need not be four; there might be fewer, or more. In this embodiment, the synchronous demodulator 720 would produce the P and Q channels of the first frequency, while the synchronous demodulators 721, 722 and 723 would produce the P and Q channels for the second, third and fourth frequencies, respectively. Note that the demodulated P and Q pairs are not actually the in-phase and quadrature, sinusoidal signals, but are signals that are related to the time-varying amplitude modulations of the sinusoidal P and Q pairs.

These frequency channel pairs would be fed to the separation processor via connections 734, 735, 736 and 737 respectively. The models 709 used in the separation processor would now be chosen from a range of frequency-domain models, rather than time-domain models as in the previously described embodiment.

The paths 740, 741 and 742 now conduct the four P and Q pairs, one from each frequency, into each of the combiners 710, 711 and 712. The rest of the process could now emulate that described as the previous embodiment.

In another embodiment, within either a time-domain or a frequency-domain detector, the DSP units 710, 711, 712 could be three identical DSP units that can process either the separated channels coming from the separation processor 708, or the channel signals, or P and Q pairs of signals, 704, 705, 706, 707, coming directly from the demodulators. Regardless of which of these alternatives is used, the DSP units 710, 711 and 712 can process the unseparated signals in the same manner as it processes the separated signals. This allows for the possibility, in another embodiment, of the user selecting whether, or not, to include the separation processor in the processing of signals through the setting of a switch. This would present an advantage were the detector occasionally operated in areas where signals due to the sources in the environment cannot be separated sufficiently well, using the models available to the separation processor. This illustrates the point that the invention is not, in itself, a method of classifying targets, but a method of separating signals that are due to independent sources. In other words, prior to the installment of the separation processor 708, there existed the transceiver 701, the synchronous demodulators 703, a detector DSP (which would be taking the place of 710 say), and an output stage 716. Since the separation processor emits the separated signals in the same form in which they are presented, it can be inserted into the processing chain and the existing detector DSP could be employed to process each of the separated channel signals 740, 741 and 742.

In one embodiment, the amplified receive signal is fed into an ADC (analog to digital converter) whose output is fed to one or more digital processors that can perform the remaining calculations of the process with digital signals and software.

In another embodiment, the channel signals, or P and Q pairs of signals, 704, 705, 706 and 707 are fed into ADCs and converted into numerical representations that are, in turn fed to one or more digital processors that can perform the remaining calculations of the process with digital signals and software.

In another embodiment, the number of models used in the separation calculation can be selected, from the range of available models, by the user of the metal detector. The selection can be made through a switch or push-button that is directly, or indirectly, connected to the separation processor.

In another embodiment, the types of models used in the separation processor can be selected, from the range of available models, by the user of the metal detector. The selection can be made through a switch or push-button that is directly, or indirectly, connected to the separation processor.

In another embodiment, the types and numbers of models used in the separation processor can be selected by the user of the metal detector. The selection can be made, through a switch or push-button that is directly, or indirectly, connected to the separation processor.

In another embodiment, the types and numbers of models used in the separation processor are selected by the metal detector, as part of the signal processing.

Figure 8:
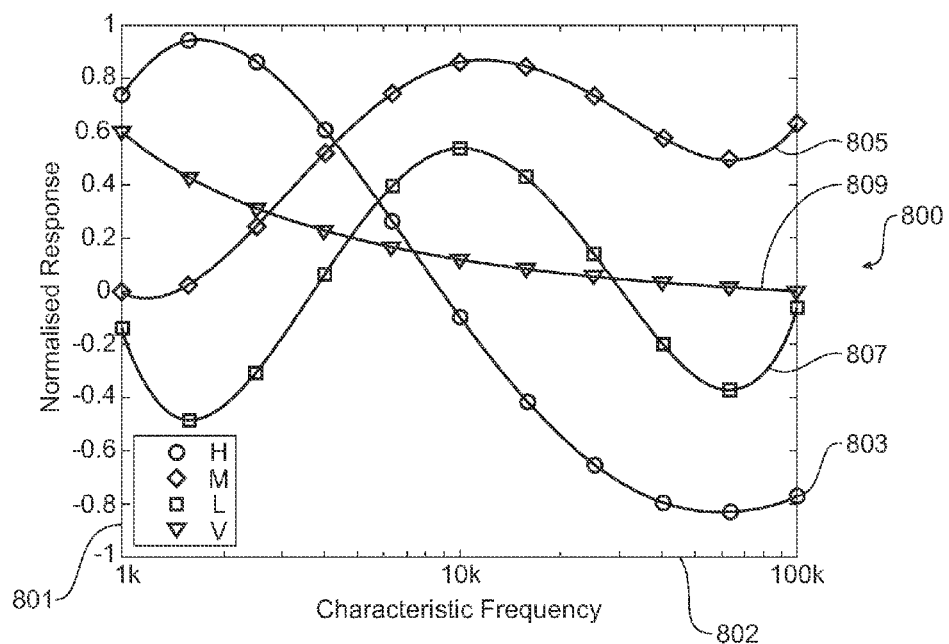
FIG. 8 shows a numerical example of models for non-ferrous targets for a PI detector with four channels.
Figure 9:
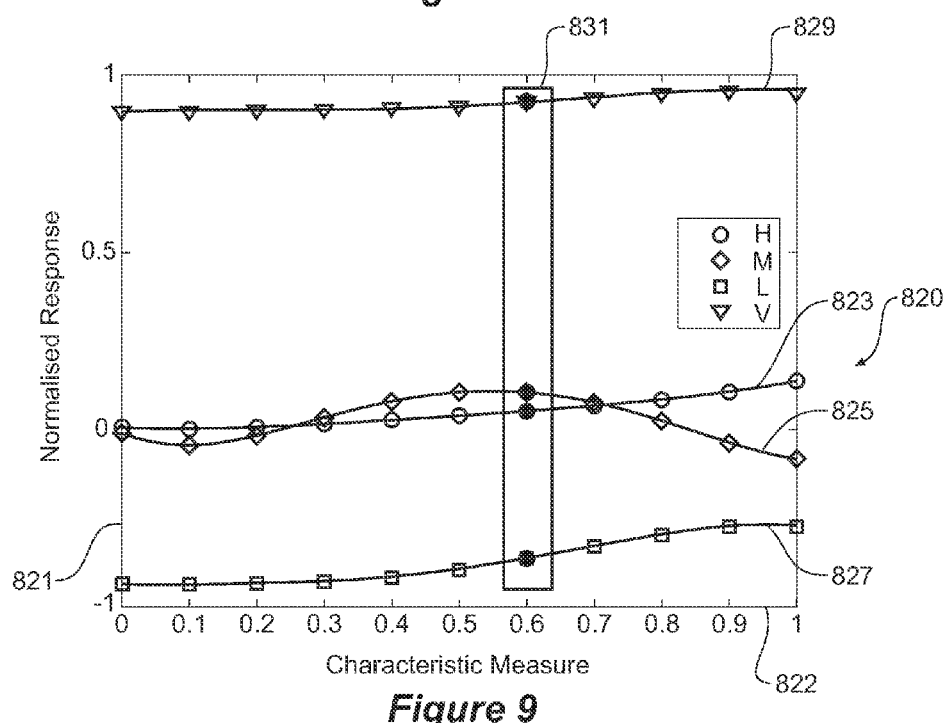
FIG. 9 shows a numerical example of models for ground for a PI detector with four channels.
Figure 10:
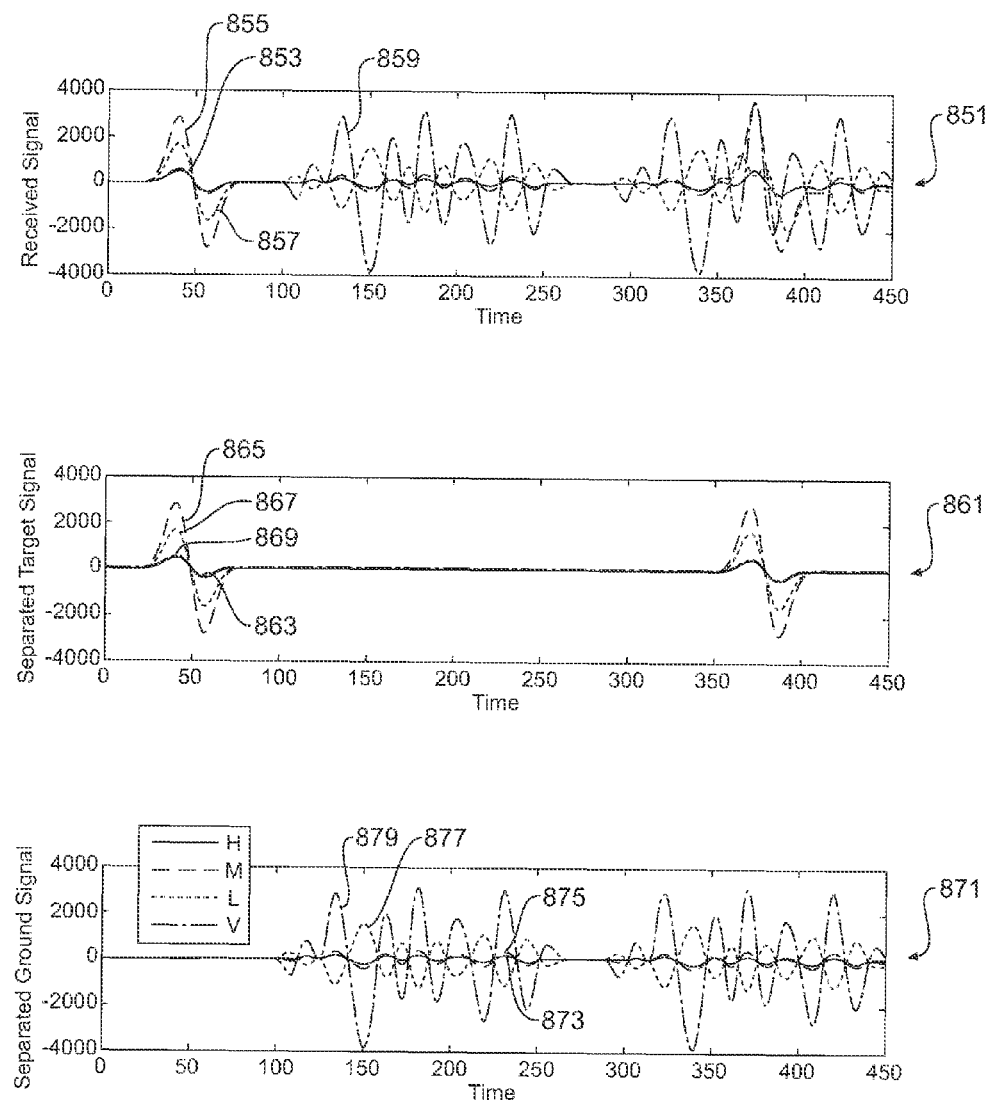
FIG. 10 shows a numerical example of the described invention separating a target and ground for a PI detector with four channels.

To illustrate further one aspect of the present invention as encapsulated in 708, a worked example is provided with reference to FIGS. 8 to 10. In this example, a PI detector is used which produces four channels, H, M, L and V. These channels correspond to the output of the demodulators shown in block 703. Each of the demodulators 720, 721, 722 and 723 are designed to be sensitive to different aspects of the object being detected.

While it could be possible to determine the models shown by 709 theoretically, it may be much easier to derive the models empirically. By using a number of known targets, that is, targets for which the characteristic frequencies are known, the response in each channel as a function of the target characteristic frequency can be determined. The PI detector used in this example has four channels and accordingly, the model of each target will have four response curves, functions of characteristic frequency. An example of a model is shown in FIG. 8.

FIG. 8 includes a graph 800 with y-axis representing normalised response 801 and x-axis representing the characteristic frequency 802. Graph 800 shows a numerical example of models for non-ferrous targets for a PI detector with four channels.

The graph markers of graph 800 show the measurement points, and the traces 803, 805, 807 and 809, representing H, M, L, V channels respectively, show the polynomial parameterisation with respect to $f_C$. In this example a polynomial of degree 4 was used, however, any other type of parameterisable function can be employed, such as a summation of radial basis functions for example. The paramaterised model of FIG. 8 for lines 803, 805, 807 and 809 can be given by $$t_T(f_C) = \begin{bmatrix} H_T(f_C) \\ M_T(f_C) \\ L_T(f_C) \\ V_T(f_C) \end{bmatrix} = \begin{bmatrix} -0.42f_c^4 + 0.99f_c^3 - 0.50f_c^2 - 1.74f_c - 0.10 \\ 1.09f_c^4 + 0.05f_c^3 - 1.64f_c^2 + 0.26f_c + 0.85 \\ 2.42f_c^4 - 0.07f_c^3 - 3.04f_c^2 + 0.11f_c + 0.52 \\ 0.08f_c^4 - 0.10f_c^3 + 0.10f_c^2 - 0.20f_c + 0.12 \end{bmatrix} \quad (16)$$

where the target model is denoted by $t_T(f_C)$. Sometimes it is useful to normalise the models; that is, for each value of $f_C$, make vector of each channel have a length of 1 as given by $t_T(f_C)/\|t_T(f_C)\|$.

In addition to the target model, 709 also contains the ground model. In practice, it can be difficult to attain the complete ground model for an entire area of detection, but often it can be assumed that the ground conditions do not change significantly over a short distance. That assumption means that it is sufficient to measure the response of the ground using a ground balance technique for example, and use that measured value of ground as a fixed model. Graph 820 of FIG. 9 shows the ground model for this PI detector. Graph 820 is with y-axis representing normalised response 821 and x axis representing the characteristic measure 822 (for example, permeability). In this graph 820, traces 823, 825, 827 and 829 represent H, M, L, V channels respectively. The highlighted points within bracket 831 define the ground model for the current operating ground. The lines are unknown, but represent the complete ground model. If the ground conditions change significantly, the detectorist will perform a ground balance to reduce the ground noise, which essentially adjusts the current 'fixed' ground model.

Since we need to measure only the current operating point, the ground model is specified by $$t_G = \begin{bmatrix} H_G \\ M_G \\ L_G \\ V_G \end{bmatrix} = \begin{bmatrix} 0.05 \\ 0.10 \\ -0.37 \\ 0.92 \end{bmatrix} \quad (17)$$

Once all the models have been established, it is useful to check them for orthogonality. If the models are not sufficiently close to being orthogonal, there may be ill-conditioned problems when trying to solve the system. The orthogonality can be tested by taking the dot product, $t_T(f_C) \cdot t_G$, which gives the cosines of the angles between the vectors if the models have been normalised.

As the sensor head passes over an object, a signal will be produced, which is also contaminated by a ground signal. At any instant during detection, the received signal can be taken and further processed. The measured signal is $$x = \begin{bmatrix} 1210 \\ 6050 \\ -12 \\ 8545 \end{bmatrix} \quad (18)$$

This has a contribution from the target and a contaminating contribution from the ground.

The goal is to separate the received signal into the target and ground source signals, and it is done in such a way that the resulting separated signals can be fed directly into the existing higher-level signal processing algorithms.

It is assumed that the received signal is constructed from the source signals according to (2), where the unknowns are $f_C$, $k_T$, and $k_G$. There are four nonlinear equations, with three unknowns, that can be solved using the GN algorithm for example, as given by (3). In this example, the following variables are defined.

$$\theta = [f_c, k_T, k_G]^T$$

$$s(\theta) = k_T \cdot t_T(f_C) + k_G \cdot t_G$$

$$= k_T \begin{bmatrix} -0.42f_c^4 + 0.99f_c^3 - 0.50f_c^2 - 1.74f_c - 0.10 \\ 1.09f_c^4 + 0.05f_c^3 - 1.64f_c^2 + 0.26f_c + 0.85 \\ 2.42f_c^4 - 0.07f_c^3 - 3.04f_c^2 + 0.11f_c + 0.52 \\ 0.08f_c^4 - 0.10f_c^3 + 0.10f_c^2 - 0.20f_c + 0.12 \end{bmatrix} + k_G \begin{bmatrix} 0.05 \\ 0.10 \\ -0.37 \\ 0.92 \end{bmatrix}$$

$$H = \frac{\partial s(\theta)}{\partial \theta} = [k_T \cdot t'_T(f_C), t_T(f_C), t_G].$$

If we assume a starting value for the unknown parameter of $\theta_0 = [3000, 6000, 6000]^T$, then the first iteration will give, $$\theta_1 = \begin{bmatrix} 3000 \\ 6000 \\ 6000 \end{bmatrix} + (H^T H)^{-1} H^T \left( \begin{bmatrix} 1210 \\ 6050 \\ -12 \\ 8545 \end{bmatrix} - 6000 t_T(3000) - 6000 \begin{bmatrix} -0.15 \\ 0.10 \\ -0.05 \\ 0.9 \end{bmatrix} \right)$$

where $$H = \left( 6000 t'_T(3000), t_T(3000), \begin{bmatrix} -0.05 \\ 0.10 \\ -0.37 \\ 0.92 \end{bmatrix} \right) = \begin{pmatrix} -7819 & 0.77 & -0.05 \\ -3260 & 0.34 & 0.10 \\ 9896 & -0.18 & -0.37 \\ 5368 & 0.27 & 0.92 \end{pmatrix}$$

Evaluating the above expression gives $$\theta_1 = \begin{bmatrix} 6184 \\ 6595 \\ 5843 \end{bmatrix}$$

Repeating for the next iteration gives $$\theta_2 = \begin{bmatrix} 6184 \\ 6595 \\ 5843 \end{bmatrix} + (H^T H)^{-1} H^T \left( \begin{bmatrix} 1210 \\ 6050 \\ -12 \\ 8545 \end{bmatrix} - 6595 t_T(6184) - 5843 \begin{bmatrix} -0.15 \\ 0.10 \\ -0.37 \\ 0.92 \end{bmatrix} \right) = \begin{bmatrix} 8035 \\ 6706 \\ 8331 \end{bmatrix}$$

The number of iterations executed will depend on the requirements, such as accuracy and CPU time available. After a number of iterations the best estimate for the parameters is $$\hat{\theta} = \begin{bmatrix} 7530 \\ 6524 \\ 8247 \end{bmatrix} = \begin{bmatrix} \hat{f}_c \\ \hat{k}_T \\ \hat{k}_G \end{bmatrix}$$

where the hat denotes the best estimated values of the parameters. The actual values of the parameters were $[7500, 6520, 8240]^T$.

Once the model parameters have been estimated, it is possible to recover the source signals by directly applying the models, that is, $\hat{k}_T t_T(\hat{f}_C)$ for the target signal and $\hat{k}_G t_G$ for the ground signal. However, for this application it is beneficial to leave the noise on the recovered signal. This gives a better measure of the quality of the recovered signal for subsequent processing. Therefore the recovered signals are recovered in the following manner.

$$s_T = x - \hat{k}_G t_G = \begin{bmatrix} 1210 \\ 6050 \\ -12 \\ 8545 \end{bmatrix} - 8247 \begin{bmatrix} -0.15 \\ 0.10 \\ -0.37 \\ 0.92 \end{bmatrix} = \begin{bmatrix} 782 \\ 5189 \\ 3009 \\ 932 \end{bmatrix}$$

and $$s_G = x - \hat{k}_T t_T(\hat{f}_c) = \begin{bmatrix} 1210 \\ 6050 \\ -12 \\ 8545 \end{bmatrix} - 6524 \begin{bmatrix} H_T(7530) \\ M_T(7530) \\ L_T(7530) \\ V_T(7530) \end{bmatrix} = \begin{bmatrix} 447 \\ 850 \\ -3031 \\ 7610 \end{bmatrix}$$

In this example, only the target signal is of importance, so the ground signal can be discarded. Once the recovery of the target signal has been performed, it can be passed onto any existing signal processing because it has the same form as the raw input data. Additionally, identification of the target could be performed using the estimated $\hat{f}_c$.

The example described above is for a single sample at a particular instant, however it is possible to perform this process for every sample of the input data FIG. 10 shows the results.

The example described above is for a single time sample. However it is possible to perform this process for every sample of the input data. FIG. 10 shows the results for the above example processed on a sample-by-sample basis. The top plot 851 includes four traces, 853, 855, 857 and 859, representing received signals in the H, M, L and V channels respectively. Plot 881 shows the received channel signals for three scenarios: the detector first passes over a coin target in air around time 50, then the detector sweeps over mineralised ground from time 100 to 260, then the detector sweeps over the same mineralised ground but with the buried coin target from time 300 to 450, with the signal from the buried target appearing at about time 380. When sweeping over mineralised ground, it is difficult to even determine that a target is present.

The middle plot 861 of FIG. 10 shows the separated target signal sT. Plot 861 includes four traces, 863, 865, 867 and 869, representing separated target signals in the H, M, L and V channels respectively. The coin target at time 50 has been extracted from the total signal, as has the signal, around time 380, from the coin buried in mineralised ground. Note that there is negligible signal from the ground appearing in the target signal. The bottom plot 871 of FIG. 10 shows the separated ground signal $s_G$. Traces, 873, 875, 877 and 879, represent signals in the H, M, L and V channels respectively. As expected, none of the previous coin target signal appears in this signal the separated ground signal.

Figure 11:
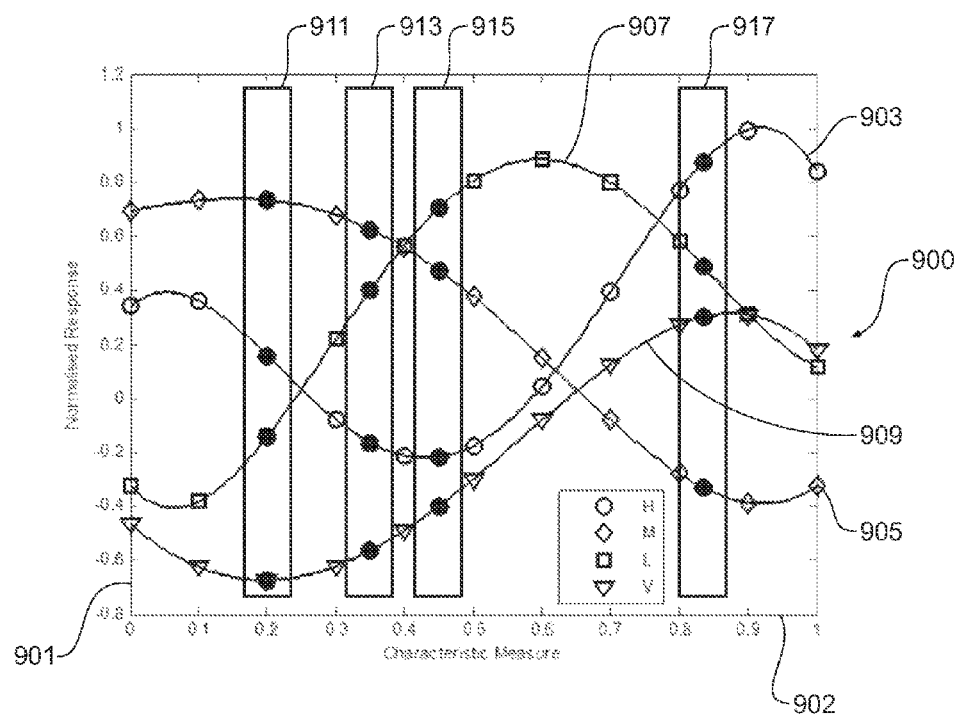
FIG. 11 shows a numerical example of models for ferrous objects for a PI detector with four channels.
Figure 12:
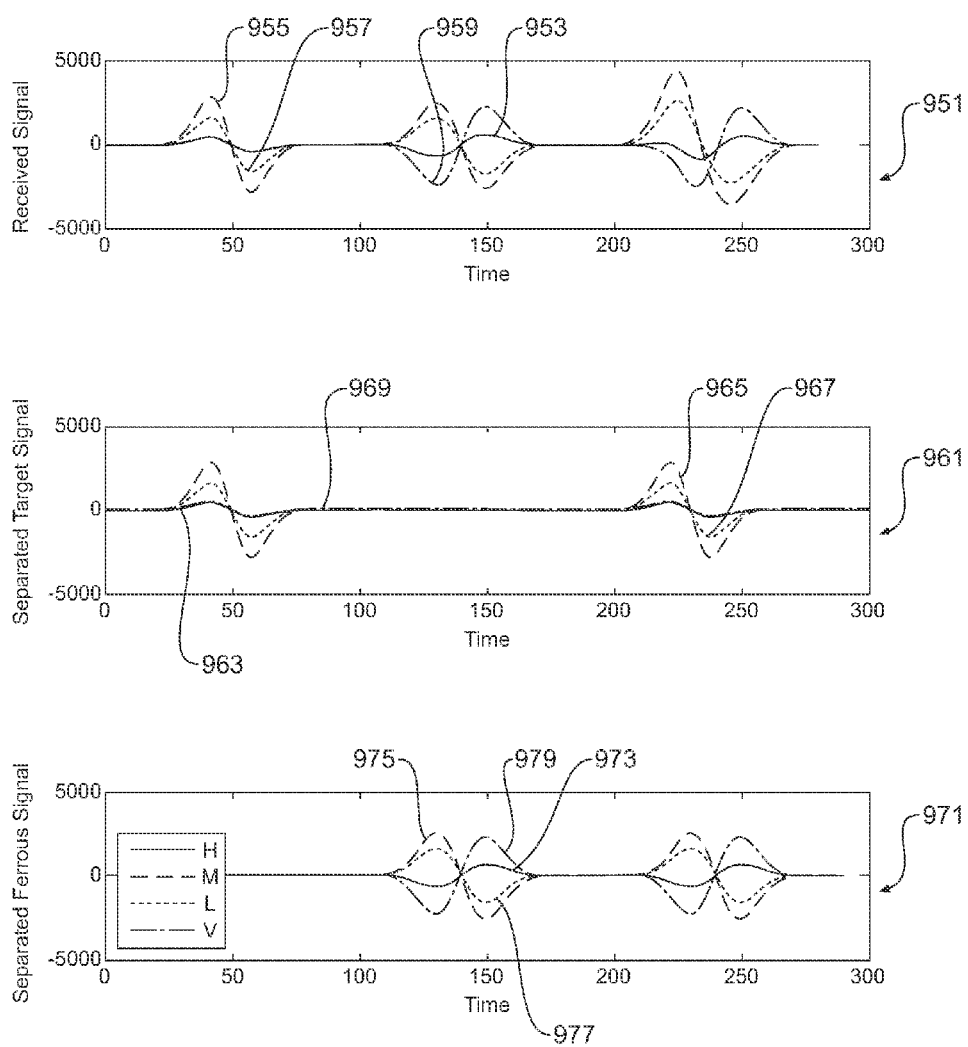
FIG. 12 shows a numerical example of the described invention separating a coin target and a ferrous object for a PI detector with four channels.

To highlight another embodiment of the present invention, a worked example is provided with reference to FIGS. 11 and 12. For the same PI detector used in the previous example, signals, from a target, contaminated with those from a ferrous object will be separated into their source components.

Since the PI detector is the same, the models for the targets remain the same, as shown in FIG. 8

For ferrous objects, in practice it may be difficult to attain a model for a variety of ferrous objects, especially for a PI detector. However, whereas the ground has only a single set of fixed values to describe a model at a particular instant, the variety of ferrous targets available means there could be many fixed models to describe all the ferrous targets of possible interest. Typically, a reduced set of models of ferrous targets can be used to characterise most of the ferrous targets from the full set.

FIG. 11 includes a graph 900 which shows the model for ferrous targets where the traces 903, 905, 907, 909 are unknown. The y axis 901 of graph 900 represents normalised response, and the x axis 902 shows the characteristic measure). The templates for the reduced set of characteristic targets are shown points within brackets 911, 913, 915 and 917.

The recorded templates are $$t_{F1} = \begin{bmatrix} H_{F1} \\ M_{F1} \\ L_{F1} \\ V_{F1} \end{bmatrix} = \begin{bmatrix} 0.16 \\ 0.73 \\ -0.14 \\ -0.67 \end{bmatrix}; t_{F2} = \begin{bmatrix} -0.16 \\ 0.63 \\ 0.40 \\ -0.56 \end{bmatrix}; t_{F3} = \begin{bmatrix} -0.22 \\ 0.47 \\ 0.70 \\ -0.40 \end{bmatrix}; \quad (19)$$

$$t_{F4} = \begin{bmatrix} 0.88 \\ -0.33 \\ 0.49 \\ 0.30 \end{bmatrix}$$

The ferrous templates are fixed. The algorithm requires that one of them be selected to represent the signals from the ferrous object being detected at the time.

During detection there is a response as the detector passes over a target, which could be a coin target, a ferrous object, or coin target and a ferrous object. An example of such a received signal is $$x = \begin{bmatrix} -632 \\ 10633 \\ 6510 \\ -3962 \end{bmatrix} \quad (20)$$

The goal of the algorithm is to separate the received signal into its source components. It is assumed received signal is defined by equation (8). Given that the forms of (8) and (2) are similar, a method similar to that used in the previous example can be employed. That is, we solve for the unknowns $k_T$, $f_C$, and $k_F$ using equation (3). The solution is found for each ferrous template and the best solution selected. For example, using the four ferrous templates shown in FIG. 11 the best solutions are (i) Using $t_{F1}$ gives $\hat{\theta}_{F1} = [14590, -219, 12171]^T$
(ii) Using $t_{F2}$ gives $\hat{\theta}_{F2} = [7500, 6520, 8240]^T$
(iii) Using $t_{F3}$ gives $\hat{\theta}_{F3} = [2046, 3989, 13452]^T$
(iv) Using $t_{F4}$ gives $\hat{\theta}_{F4} = [41562, 16345, 13066]^T$ To select which is the most appropriate ferrous template, select the one with the best fit, that is, the one that has the lowest sum square error (SSE), given by $$\text{SSE} = (x - s(\hat{\theta}))^T (x - s(\hat{\theta})) \quad (21)$$

Evaluating this for the four ferrous templates gives $\text{SSE}_1 = 1.6 \times 10^8$, $\text{SSE}_2 = 5.0 \times 10^{-8}$, $\text{SSE}_3 = 2.0 \times 10^7$, and $\text{SSE}_4 = 1.3 \times 10^8$. Therefore, since $\text{SSE}_2$ is the smallest, the $t_{F2}$ ferrous template is selected. The recovery of the signals $S_T$ and $s_F$ can then be performed. In this example, we care about both signals; hence, each can be processed in the existing signal processing.

In a manner similar to the target and ground example, it is possible to perform this process for every sample of the input data FIG. 12 shows the results for the above example processed on a sample-by-sample basis. The top plot 951 includes four traces, 953, 955, 957 and 959, representing the total received signals in the H, M, L and V channels respectively. The top plot 951 shows the raw channel signals for three scenarios: the detector first passes over a coin target in air around time 50, then passes over a ferrous object around time 140, then the detector passes over a coin target and a ferrous object in close proximity at around time 230. When sweeping over both targets simultaneously, it is difficult to determine the identity of the two targets.

The middle plot 961 of FIG. 12 shows the signal $S_T$ due to the target, separated from the total signal. Plot 961 includes four traces, 963, 965, 967 and 969, representing the separated signal in the H, M, L and V channels respectively. The coin target signal around time 50 has been extracted from the total signal around time 50, as has the coin signal when the coin is in the presence of the ferrous object around time 230. Note that there is negligible ferrous signal appearing in the separated target signal. Similarly, the bottom plot 971 of FIG. 12 shows the separated ferrous signal $s_F$ using traces 973, 975, 977 and 979, each representing the H, M, L and V channels respectively. Only the ferrous objects appear in the separated ferrous signal.

For a frequency domain detector, each demodulation unit produces two signals, the in-phase component and the quadrature component. For example, for a frequency domain detector transmitting two frequencies, there would be four measurements, or two complex measurements, such as $x = [200 + j350, 500 + j50]^T$. The received signal is still assumed to be of the form of (2), for the target and ground case, thus the same unknowns need to be solved, namely $f_C$, $k_T$, and $k_G$. Therefore, with the use of the appropriate models, such as those shown in FIGS. 6A, 6B and 6C, the system can be solved in the same manner as for a PI detector. Similarly, the target signal can be recovered by (5).

A detailed description of one or more preferred embodiments of the invention is provided above along with accompanying figures that illustrate, by way of example, the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the description above in order to provide a thorough understanding of the present invention. The present invention may be practised according to the claims without some or all of these specific details. For the purpose of clarity, technical material that is known in the technical fields related to the invention has not been described in detail so that the present invention is not unnecessarily obscured.

Throughout this specification and the claims that follow, unless the context requires otherwise, the words 'comprise' and 'include' and variations such as 'comprising' and 'including' will be understood to imply the inclusion of a stated integer or group of integers, but not the exclusion of any other integer or group of integers.

The reference to any prior art in this specification is not, and should not be taken as, an acknowledgment or any form of suggestion that such prior art forms part of the common general knowledge of the technical field.

The invention claimed is:

1. A method for detecting electrically conductive targets in soil comprising:
    generating a transmit magnetic field for transmission into the soil based on a transmit signal;
    receiving a receive magnetic field;
    providing a receive signal induced by the receive magnetic field;
    selecting at least two models, each approximating a form of a signal due to a different type of source;
    processing the receive signal using the at least two models to produce at least two independent signals, each representing a component of the receive signal due to a different type of source; and
    producing, based on at least two independent signals, an indicator output signal indicative of the presence of the electrically conductive target;
    wherein the at least two models selected are two of the following models: a model representing signals due to all ferrous objects, a model representing signals due to all non-ferrous objects, and a model representing signals due to soil.

2. A method according to claim 1, wherein the selecting at least two models includes:
    selecting the model representing signals due to all ferrous objects and the model representing signals due to all non-ferrous objects.

3. A method according to claim 1, wherein the selecting at least two models includes:
    selecting the model representing signals due to all non-ferrous objects and the model representing signals due to soil.

4. A method according to claim 1, wherein the selecting at least two models includes:
    selecting the model representing signals due to soil and the model representing signals due to all ferrous objects.

5. A method according to claim 1, wherein the at least two independent signals are further processed to further quantify one or more parameters of the electrically conductive target.

6. A metal detector configured to perform the method of claim 1.

7. A method according to claim 1, wherein the selecting at least two models includes:
    selecting three models, the three models being the model representing signals due to all ferrous objects, the model representing signals due to all non-ferrous objects and the model representing signals due to soil.

8. A metal detector for detecting an electrically conductive target in soil, comprising:
    a transmitter for transmitting a magnetic field into the soil based on a transmit signal;
    a receiver for receiving a receive magnetic field to provide a receive signal induced by the receive magnetic field; and
    a processor for selecting at least two models, each approximating a form of a signal due to a different type of source, processing the receive signal using the at least two models to produce at least two independent signals, each representing a component of the receive signal due to a different type of source, and producing, based on at least two independent signals, an indicator output signal indicative of the presence of the electrically conductive target; wherein the at least two models selected are two of the following models: a model representing signals due to all ferrous objects, a model representing signals due to all non-ferrous objects, and a model representing signals due to soil.

9. A metal detector according to claim 8, wherein the at least two models include:
    the model representing signals due to all ferrous objects and the model representing signals due to all non-ferrous objects.

10. A metal detector according to claim 8, wherein the at least two models include:
    the model representing signals due to all non-ferrous objects and the model representing signals due to soil.

11. A metal detector according to claim 8, wherein the at least two models include:
    the model representing signals due to soil and the model representing signals due to all ferrous objects.

12. The metal detector of claim 8, wherein the selecting at least two models includes:
    selecting three models, the three models being the model representing signals due to all ferrous objects, the model representing signals due to all non-ferrous objects and the model representing signals due to soil.

13. A time-domain metal detector comprising:
    a transmitter for transmitting a magnetic field into the soil based on a transmit signal;
    a receiver for receiving a receive magnetic field to provide a receive signal induced by the receive magnetic field;
    a synchronous demodulator for synchronous demodulating the receive signal using at least two different synchronous demodulation functions to produce at least two demodulated signals; and
    a processor for selecting at least two models, each approximating a form of a signal due to a different type of source, processing the at least two demodulated signals using the at least two models respectively to produce at least two independent signals, each representing a component of the receive signal due to a different type of source; and producing, based on at least two independent signals, an indicator output signal indicative of the presence of the electrically conductive target; wherein the at least two models selected are two of the following models: a model representing signals due to all ferrous objects, a model representing signals due to all non-ferrous objects, and a model representing signals due to soil.

14. A frequency-domain metal detector comprising:

a transmitter for transmitting a magnetic field into the soil based on a transmit signal;

a receiver for receiving a receive magnetic field to provide a receive signal induced by the receive magnetic field;

a synchronous demodulator for synchronous demodulating the receive signal using at least two different sinusoidal frequencies to produce at least two demodulated signals; and a processor for selecting at least two models, each approximating a form of a signal due to a different type of source, processing the at least two demodulated signals using the at least two models respectively to produce at least two independent signals, each representing a component of the receive signal due to a different type of source; and producing, based on at least two independent signals, an indicator output signal indicative of the presence of the electrically conductive target; wherein the at least two models selected are two of the following models: a model representing signals due to all ferrous objects, a model representing signals due to all non-ferrous objects, and a model representing signals due to soil.

* * * * *